INVENTOR.
GEORGE T. MARKEY
BY
ATTORNEY

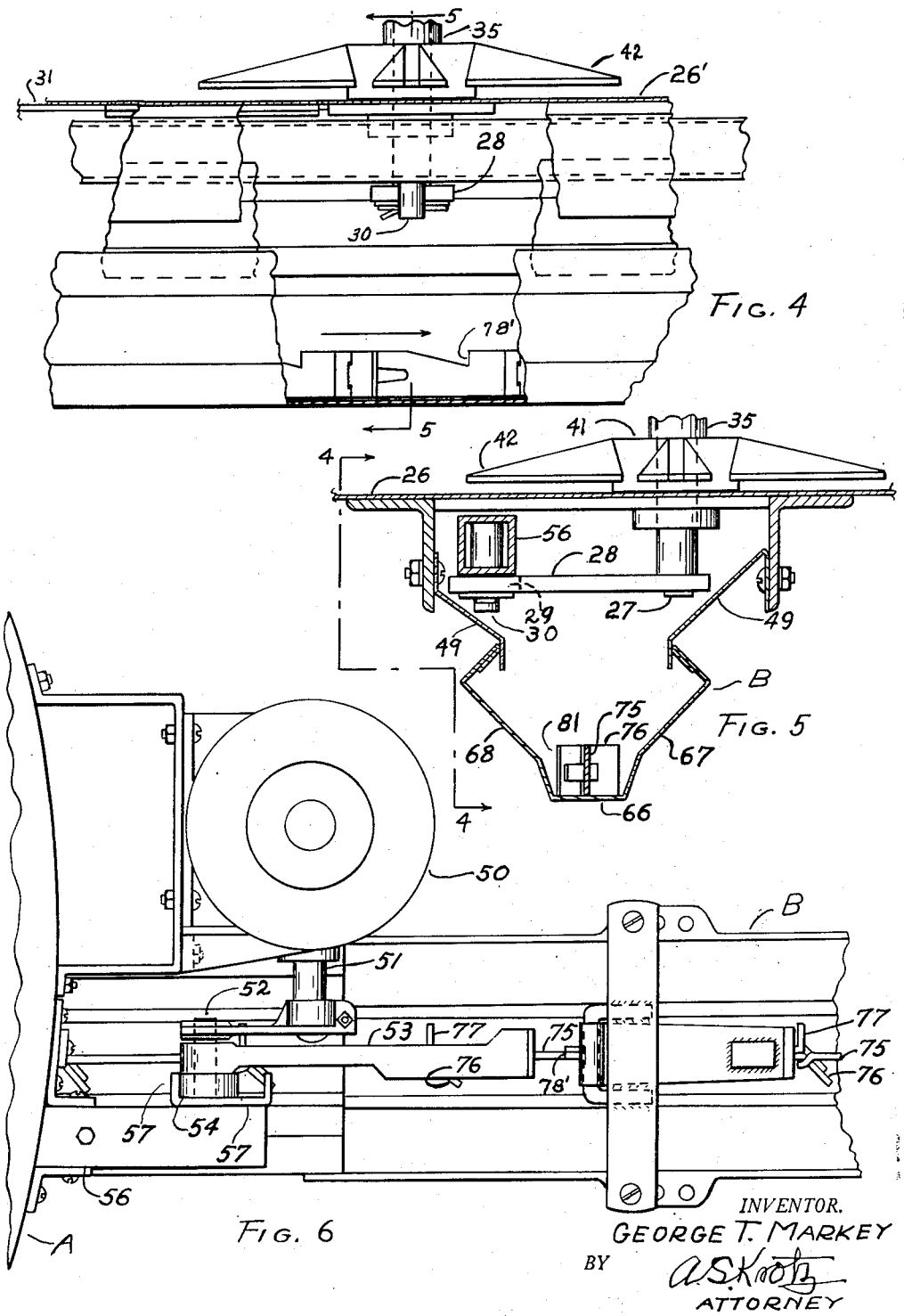

July 13, 1954 G. T. MARKEY 2,683,439
ENDLESS CONVEYER POULTRY FEEDER
Filed Sept. 21, 1950 5 Sheets-Sheet 4
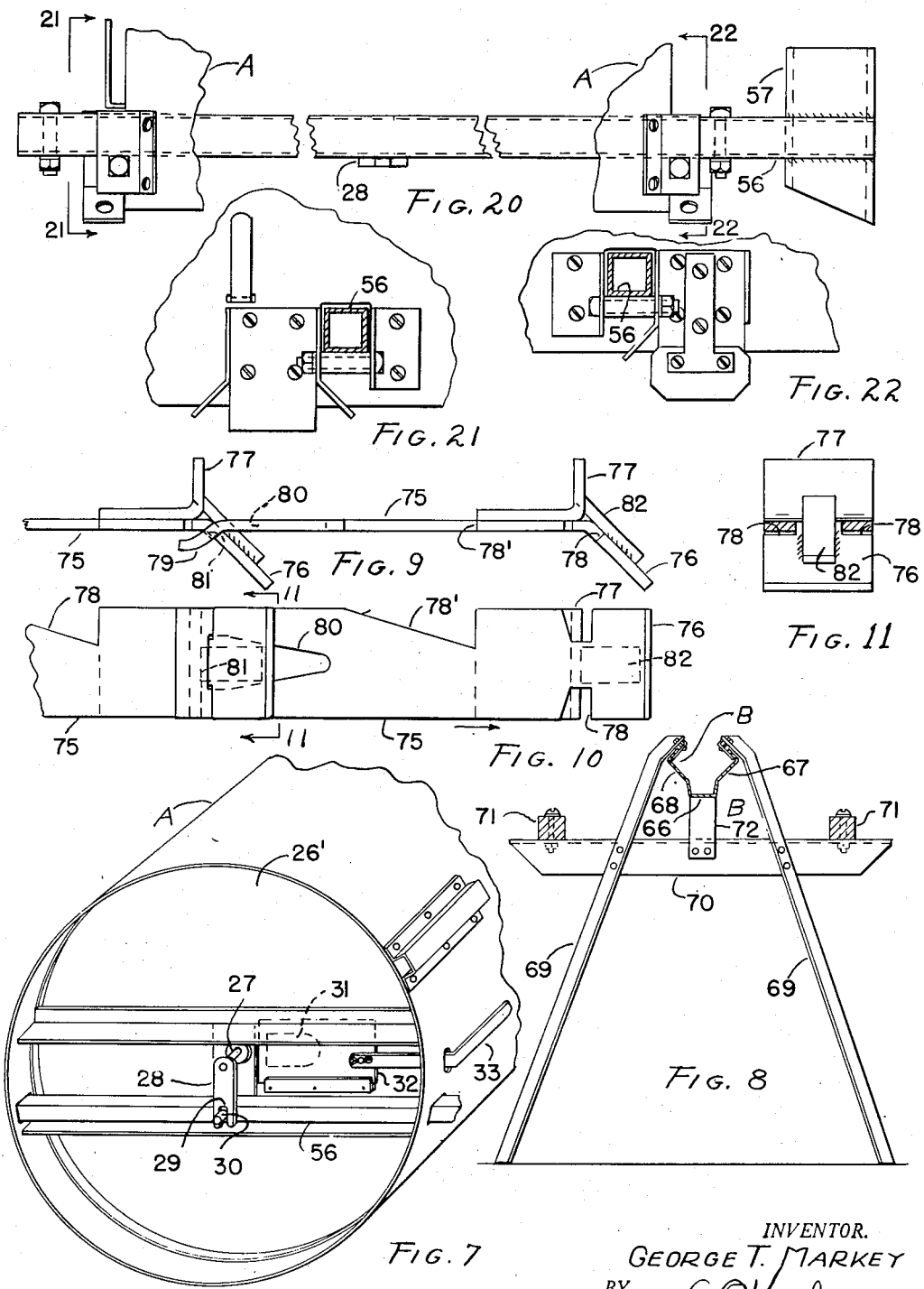
INVENTOR.
GEORGE T. MARKEY
BY
ATTORNEY July 13, 1954    G. T. MARKEY    2,683,439
ENDLESS CONVEYER POULTRY FEEDER
Filed Sept. 21, 1950    5 Sheets-Sheet 5
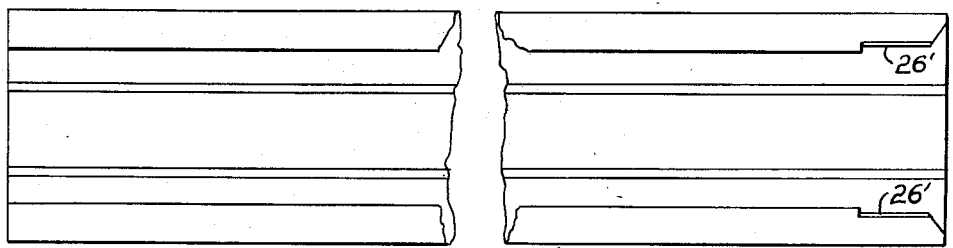
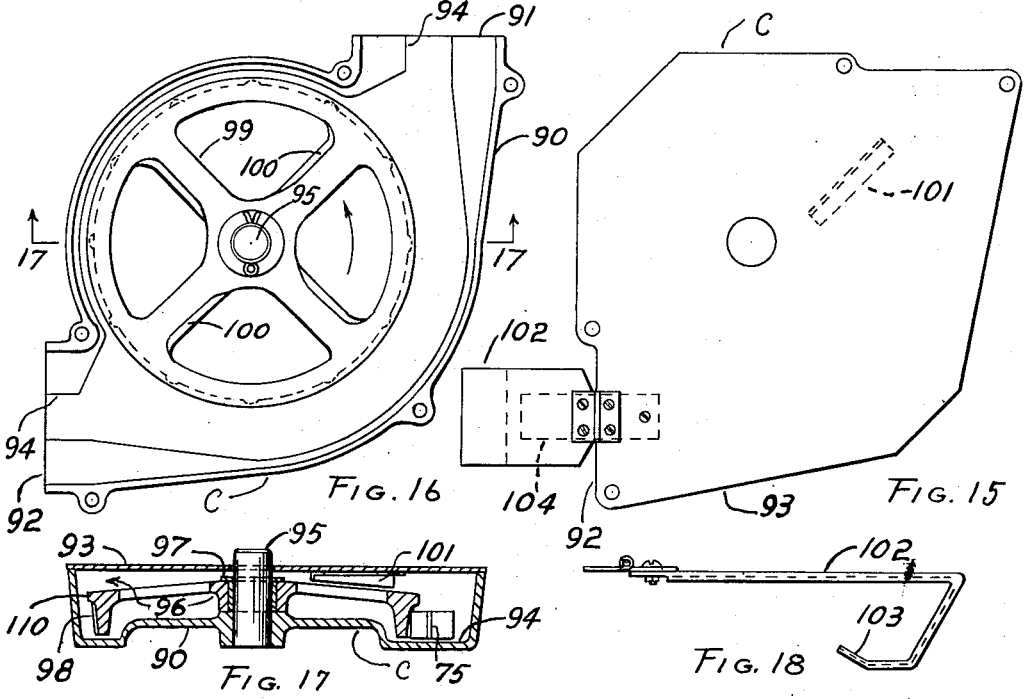
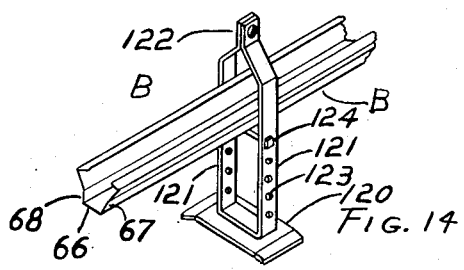
INVENTOR.
GEORGE T. MARKEY
BY
ATTORNEY Patented July 13, 1954

2,683,439

UNITED STATES PATENT OFFICE 2,683,439

ENDLESS CONVEYER POULTRY FEEDER

George T. Markey, Fort Atkinson, Wis., assignor to James Manufacturing Company, Fort Atkinson, Wis., a company of Wisconsin Application September 21, 1950, Serial No. 186,079

6 Claims. (Cl. 119—52)

The present invention relates to a motor driven poultry feeder adapted to feed the mash or grain or a combination of each to the poultry from a single storage hopper and through an endless trough having a conveyor chain for conveying the feed from the hopper through the trough and with means for maintaining a desired level of the feed in the trough.

In addition to the next above statement, an important object of the present invention is to provide a clock controlled timing device adapted to cause the conveyor chain and feed stirring devices to move intermittently and also at predetermined, spaced apart intervals.

Another object of the present invention is to provide perches when desired on opposite sides of the endless trough and being supported on the trough supporting means. Otherwise an object is to provide a simpler lower supporting means, whereby the birds may feed from the trough while standing on the floor.

An important object of the present invention is to provide a device of the character that can be manufactured at low cost and is economical, easily operated, durable and not apt to get out of order.

To these and other useful ends my invention consists of parts, combinations of parts or their equivalents and mode of operation as hereinafter described and claimed and shown in the accompanying drawings in which:

Fig. 4 is a fractional enlarged view of the hopper, trough and mechanism for driving the stirring device in the hopper.

Fig. 5 is an end sectional view taken on lines 5—5 of Figure 4.

Fig. 6 is an enlarged top view showing a fraction of the hopper, the motor attached thereto, and a fraction of the trough illustrating the mechanism for driving the feeder chain.

Fig. 7 is a reduced perspective bottom view of the hopper illustrating the manually controlled means for regulating the flow of material from the hopper into the trough; also illustrating the driver connection to the shaft that extends into the top of the hopper for operating the stirring means shown in Figure 1.

Fig. 8 is a transverse section through the trough illustrating the high support therefor, and the perches thereon.

Fig. 9 is an enlarged top view of a fraction of the trough feeder chain.

Fig. 10 is an enlarged side elevational view of a fraction of the chain as shown in Figure 9.

Fig. 11 is an end sectional view of the feeder chain taken on dotted line 11—11 of Figure 10.

Fig. 12 is an enlarged end view of the feeder trough taken on line 8—8 of Figure 3.

Fig. 13 is a cut-away top view of a length of feeder trough.

Fig. 14 illustrates a feeder trough support having a length so the birds may feed from the trough without perches.

Fig. 15 is a top view of the covering for the corner sections of the trough.

Fig. 16 is a top view of the corner section with the lid removed.

Fig. 17 is a sectional view taken on line 17—17 of Figure 16.

Fig. 18 illustrates an enlarged chick guard or closure of the trough at the corner section.

Fig. 19 illustrates an enlarged feeder chain hold down bracket.

Fig. 20 illustrates the reciprocating connection between the operating crank 52 (see Figure 6) and the crank 30 (see Figure 7) which operates the vertical shaft in the feed hopper.

Figs. 21 and 22 illustrates the brackets shown in Figure 20.

Figure 1:
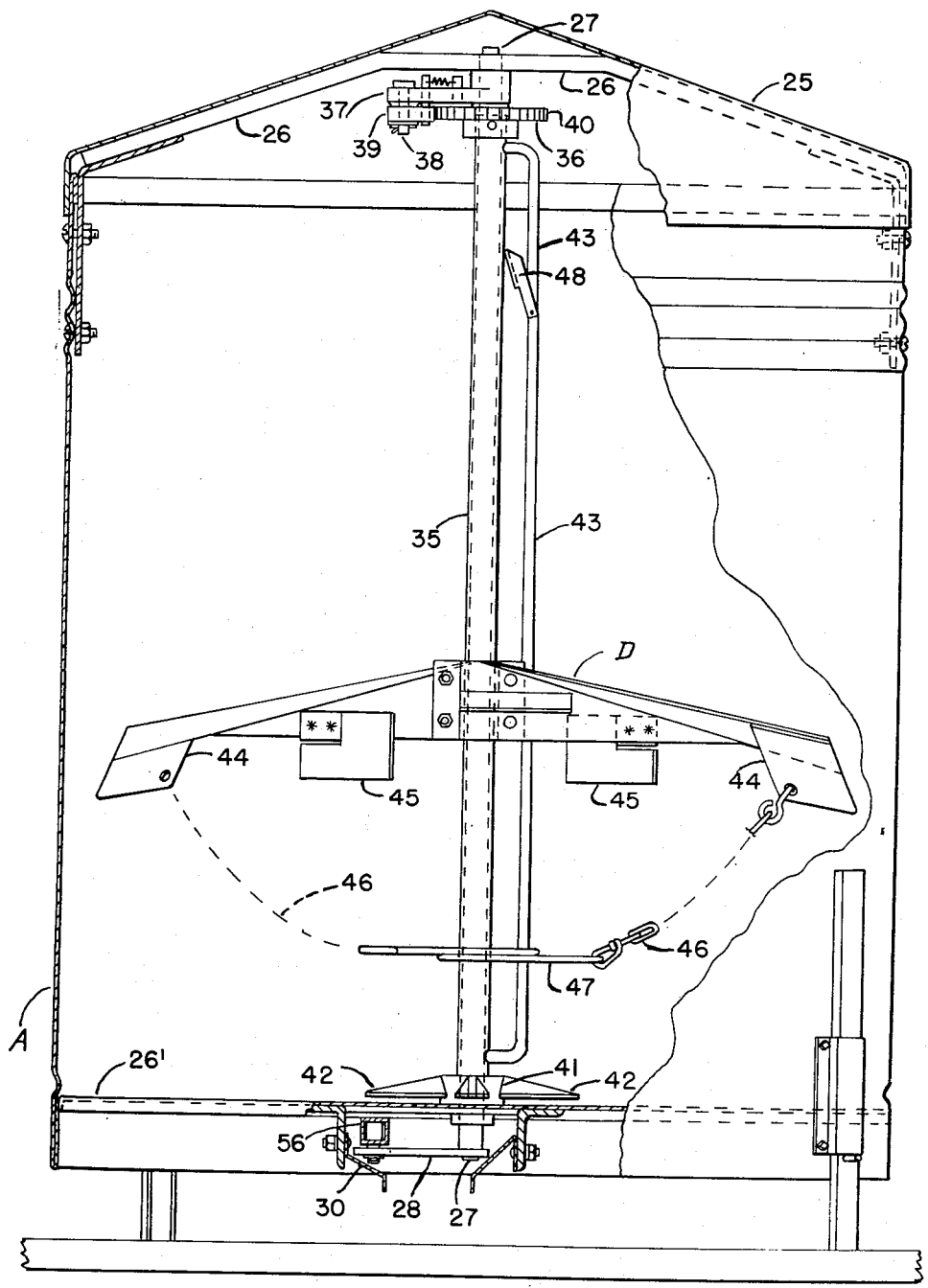
Fig. 1 is a transverse vertical section through the center of my feed hopper adapted to serve an endless feeder trough.

As thus illustrated reference character A designates the feed hopper in its entirety. Reference character B designates the feed trough in its entirety. Reference character C designates in their entireties the feed trough corner brackets.

In a room equipped with my invention the nests, roosts, and other necessary appertenances may be advantageously positioned regardless of the width and length of the room, the hopper being in position preferably near the entrance of the room for convenience, and the length and width of the trough assembly being made to suit the size of the room.

Hopper A is provided with a peaked lid 25 as illustrated to cover and prevent the birds from roosting thereon. A brace member 26 is secured to the hopper into which the upper end of a shaft 27 is journaled, and member 26 may also act as a support for lid 25.

This shaft extends through the hopper and is journaled in the bottom 26' of the hopper (see Figure 4), and having secured to its protruding end an arm 28 (see Figure 7) with a slot 29 at its free end which is engaged by a reciprocating pin 30 (see Figure 7) for the purpose of oscillating shaft 27. The bottom 26' of hopper A is provided with an opening 31 shown by dotted lines in Figure 7.

I provide a slide valve 32 having an extension 33, which extends to the exterior of the hopper so valve 32 may be manually moved for regulating the flow of feed through opening 31.

I provide means for stirring the mash in the hopper and for causing the mash to feed evenly through opening 31 as follows:

A tube 35 rotatably surrounds shaft 27 and has on its upper end a ratchet 36. Shaft 27 has secured thereto a crank 37 with a pin 38 on its free end. A ratchet dog 39 is at one end pivoted on pin 38, its free end being adapted to engage teeth 40 on member 36 ratchet like, so that tube 35 will be intermittently revolved around the shaft 27. At the bottom of tube 35 I secure an armed spider 41. The projecting arms 42 are positioned adjacent bottom member 26' and extend over opening 31, thus to agitate and stir the feed and cause it to flow evenly through this opening.

In order to prevent the banking or clogging or caking of the mash in the hopper, I provide a leveling member which in its entirety is designated by reference character D. This member is slidably mounted on the tube 35 and a bar 43 extends parallel to tube 35 and is secured thereto at opposite ends and agitates the feed from top to bottom of the hopper and extends through member D so as to act as a driver for this member.

Member D has preferably four depending plates 44—44 and 45—45. These plates are angled so they will ride on the surface of the mash, and feed the mash toward the center of the hopper. In order to cause the mash to feed uniformly downwardly in the hopper, I provide two chains 46—46, their outer ends being connected to members 44 and their inner ends being connected by a loop 47 which loosely surrounds tube 35 and bar 43.

Thus it will be seen that the feed will be caused to move downwardly en masse and will be fed uniformly through opening 31 into the feed trough B which is endless consists of a series of lengths as shown in Figure 13 and described in column 5, and extends under the hopper and under opening 31.

When it is necessary to refill hopper A, member D is lifted to the top of the hopper, and is held in its lifted position by dog 48. After the hopper has been refilled, member D is released and permitted to lie freely on the feed. Trough B, it will be noted, is somewhat to one side of the center of hopper A (see Figure 5). I provide plates 49—49 to accommodate this position.

Figure 2:
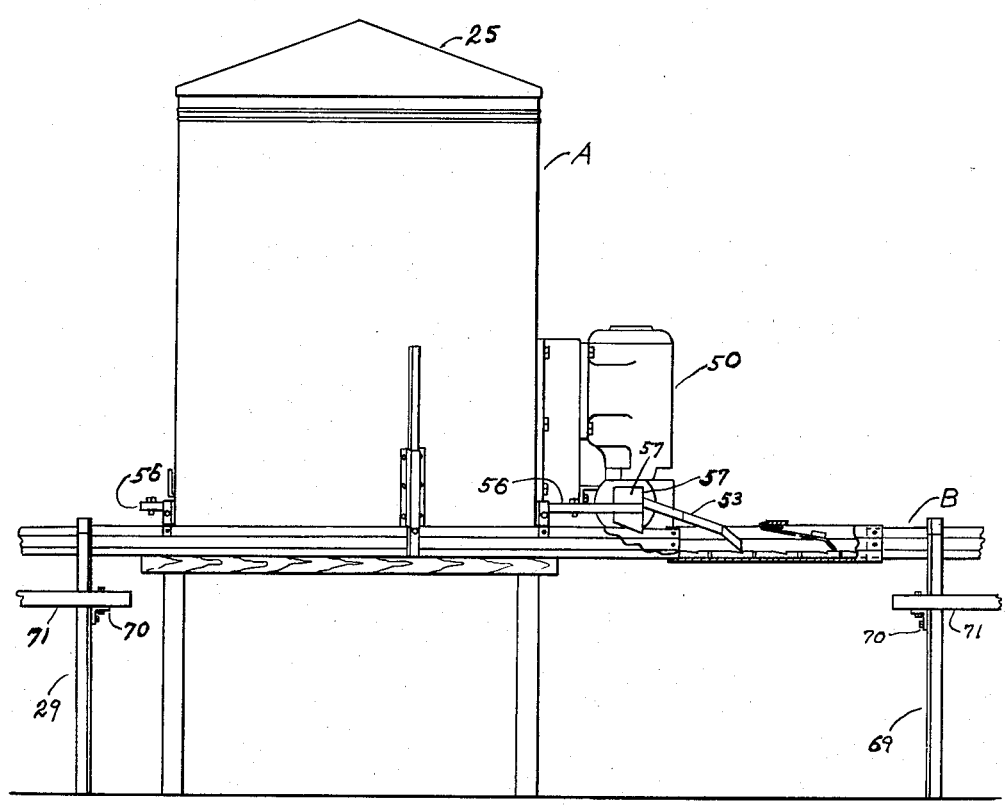
Fig. 2 is a side elevational view of the hopper shown in Figure 1 illustrating the driving motor and a fraction of the trough partially sectioned using the elevated trough mounting as illustrated in Figure 8.
Figure 3:
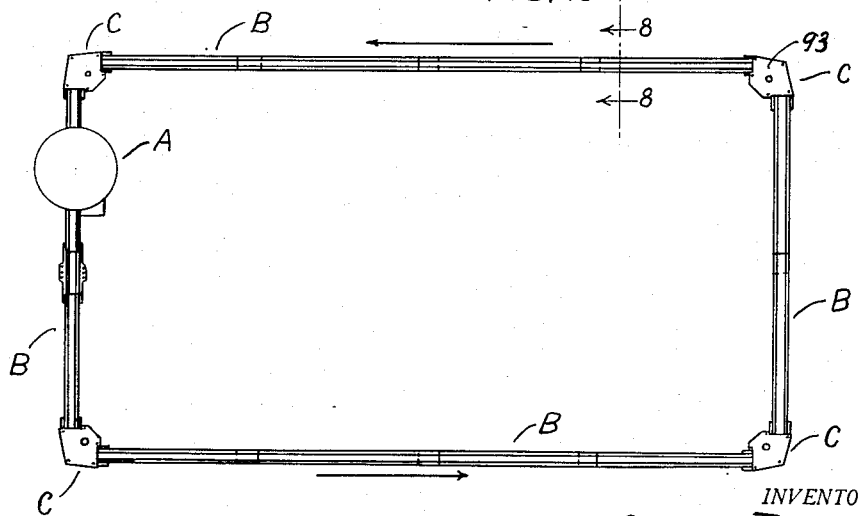
Fig. 3 is a top view reduced in size and illustrating a complete assembly, the perches and trough supports not being shown.

Referring now to Figures 2 and 6, an electric motor 50 is, in any convenient way, secured to member A. A speed reducing gear (not shown) is arranged to drive a crank shaft 51, this shaft having a crank 52. A connecting rod or dog 53 is at one end rotatably mounted on crank 52, the free end of which is adapted to engage notches in the trough chain as will hereinafter appear.

A bar 56 is slidably mounted on member A and having a U-shaped member 57 vertically secured thereto, the flanges of which are preferably somewhat further apart than the diameter of roller 54 which is rotatably mounted on crank 52, so as to give bar 56 a desirable distance of travel. Thus bar 56 will be reciprocated and having pin 30 secured thereto (see Figure 7) for a purpose already described. Thus tube 35 is turned very slowly intermittently by crank 52, and the speed of the endless conveyor chain is very slow.

Feed trough B is specifically and clearly shown in Figure 5 wherein a shallow depression 66 is shown having outwardly and upwardly extending extensions 67 and 68, each extension having upwardly and inwardly extending extensions 65 and 65'.

Trough B is supported by means of members 69—69, the upper ends of which are secured to the upper flange of the trough (see Figure 8). I provide a cross member 70 secured to members 69 about as shown and having perches 71—71 upon which the birds stand for eating from the trough. I also supply a supporting plate 72 for the trough. Thus it will be seen that the trough and perches will be firmly supported on the floor.

My novel conveyor chain comprises links 75, having a shape at their front end as at 76, 77 and 78, with toothed notches 78' in their upper sides, which are adapted to be engaged by dog 53, the dog operating to move the chain forward the distance between notches at every revolution of crank 52.

Referring again to the front end of chain link 75, it will be noted that member 76 is an extension of member 75, and that the space between members 75 and 76 is cut away on opposite sides as at 78—78. A portion 80 is cut away from member 75 terminating at its rear as at 81.

Thus it will be seen that the chain is completed by holding the front end of a link at right angles to the rear of another link, so member 76 may be inserted into opening 80, and then the links moved parallel to each other as shown in Figure 10, thus to form a vertically arranged hinged joint between links, whereby the links will permit the chain to travel to the left around an idler wheel at the corners of the trough.

It will be seen that members 76 and 77 form transversely extending paddles for engaging the feed and moving it forward and around the corners of the trough at every revolution of shaft 51.

I will now describe my novel means for connecting the ends of the trough sections to each other at each corner. A bracket 90 (see Figures 16 and 17), preferably cast iron, is provided and adapted to receive the ends of trough sections at 91 and 92. A plate 93 is adapted to be secured to bracket 90 and a trench 94 is provided in bracket 90 which intersects the bottom trench of the troughs, and is curved on a radius with a pin 95 which is secured to member 90.

I mount an idler wheel 96 on pin 95 and hold it in its lowest position preferably by a cotter pin 97. Idler 96 is provided with a transversely roughened surface 98 on which the outer edges of members 77 ride, thus the chain will be freely carried by idler 96 from one trough to another, and the flange formed by member 98 traveling close to or on the bottom of trench 94 will, to a large extent, prevent the feed from moving inwardly as it passes around the corner.

Member 96 has preferably four spokes 99 each of which have a forwardly and downwardly extending flange 100, which will act to move any feed or mash that may accumulate in the space around the spokes upwardly and outwardly as indicated by arrow in Figure 17. This movement is encouraged by a narrow flange 101 which depends from plate 93 as indicated by dotted lines in Figure 15.

In this construction it will be seen that there will be an opening of considerable size under plate 93 at the end of the troughs. To block this opening against small chick entering, I provide a hinged bracket 102 which extends down into the trough terminating in a runner shape extension 103, which will ride on the chain freely and tend to smooth down the mash.

Another bracket 104 is attached to plate 93 and under guard 104 at the entrance end of plate 93 to hold down the conveyor chain.

Under some conditions it is desirable to position the feed troughs close to the floor so the birds can eat out of the trough while standing on the floor. For this purpose, I provide supports shown in Figure 14, each having a pedestal 120 with spaced apart vertical bars 121 which are shaped and secured together at their tops as at 122, bars 121 each have spaced holes 123 for the reception of a bolt 124 on which the trough lies. Thus the trough may be adjusted to different vertical positions for an obvious purpose.

It will be noted that the top edge of one end of each length of trough as shown in Figure 13 is cut-away as at 26'—26' to allow it to telescope into the next length of trough. The bent-in top edges of the trough acts to prevent billing the feed out of the trough and onto the floor.

It will be understood that my conveyor chain is caused to move very slowly because of the reduction gearing between motor 50 and shaft 51, and for the same reason, the stirring means in member A will turn very slowly. However, in devices of the character, for obvious reasons, it is desirable to use a clock controlled switch (not shown) as recited in the preamble of this specification. Such controlling devices are so well known that it is not thought necessary to show and describe the device.

I have shown the preferred embodiment of my invention. Clearly many minor detail changes can be made in the design shown without departing from the spirit and scope of my invention, as recited in the appended claims.

I claim:

1. A poultry feeder of the character described comprising, a feed hopper, a number of feed troughs connected together at their ends to form an endless feed trough, a portion of one of said troughs being positioned under said feed hopper, an opening in the bottom of said feed hopper positioned over the adjacent trough, an endless conveyor chain positioned in said endless feed trough, the links of said conveyor chain having upwardly extending notches, rotatably mounted stirring means in said feed hopper having other stirring means attached thereto and positioned adjacent the upper side of the bottom of said feed hopper adapted to urge the feed into said opening, a motor associated with said hopper having a slow speed crank shaft operatively connected thereto, a connecting rod operatively connected at one end to the crank of said crank shaft, its other end adapted to engage said notches ratchet like for moving the chain forward at every revolution of said crank shaft, a bar slidably mounted under said hopper having an operating connection with the crank of said crank shaft with connecting means for intermittently turning said stirring means.

2. A device as recited in claim 1 including, said conveyor chain comprising links adapted to be detachably secured together with the flat sides of the links arranged vertically, their front ends having horizontally outwardly projecting paddles for moving the feed in the trough.

3. A device as recited in claim 1 including, said endless trough being formed into four separate sections, their ends being secured together by means of brackets shaped to register with the ends of said troughs and form a curved connection between the ends of the trough for said chain, means attached to said brackets adapted to guide said chain from one trough to the other.

4. A device as recited in claim 1 including, said corner bracket having a removable cover plate and means adapted to hold the chain from raising out of position.

5. A device as recited in claim 1 including, said troughs having outwardly diverging side members, their tops being extended inwardly and upwardly and having spaced supporting means, comprising downwardly diverging legs, their upper ends being adapted to be detachably secured to the troughs, transverse members secured to said legs a short distance below the troughs and extending a distance outwardly from the legs, perches mounted on said transverse members and parallel to the trough and a suitable distance therefrom as and for the purpose specified.

6. A device as recited in claim 1 including, said stirring means comprising a shaft, the lower end extending freely through the bottom of said hopper, its upper end being freely mounted in the upper end of said hopper, a tube rotatably mounted on said shaft and extending from adjacent the bottom of said hopper to within a short distance of the top of said shaft, an arm secured to said shaft adjacent the upper end of said tube, a ratchet secured to said tube and a dog hingedly mounted on the end of said arm and adapted to engage said ratchet, for imparting an intermittent rotating motion to the tube, a floating stirring means slidably mounted on said tube and having an operating connection to the tube.

References Cited in the file of this patent

UNITED STATES PATENTS

| Number | Name | Date |
|---|---|---|
| 312,341 | Duryea | Feb. 17, 1885 |
| 871,469 | Bliedung | Nov. 19, 1907 |
| 1,427,553 | Schwinger | Aug. 29, 1922 |
| 1,896,096 | Parker | Feb. 7, 1933 |
| 2,011,684 | Martin | Aug. 20, 1935 |
| 2,043,595 | Raymond | June 9, 1936 |
| 2,302,314 | Haggart | Nov. 17, 1942 |
| 2,522,449 | Inman | Sept. 12, 1950 |
| 2,589,706 | Kitson et al. | Mar. 18, 1952 |
| 2,600,869 | Harkness et al. | June 17, 1952 |

OTHER REFERENCES

Automatic Poultry Feeder Plan, Pennsylvania State College Bulletin, Progress Report No. 2, Agricultural School.